(12) United States Patent
Blair

(10) Patent No.: US 7,028,727 B1
(45) Date of Patent: Apr. 18, 2006

(54) EASY USE VALVED FLUID CONTAINER ASSEMBLY AND VALVE SYSTEM FOR SAME

(75) Inventor: James F. L. Blair, Shannon, IL (US)

(73) Assignee: Saint Technologies, Inc., Shannon, IL (US)

( * ) Notice: Subject to any disclaimer, the term of this patent is extended or adjusted under 35 U.S.C. 154(b) by 103 days.

(21) Appl. No.: 10/644,526

(22) Filed: Aug. 20, 2003

Related U.S. Application Data

(63) Continuation-in-part of application No. 10/313,224, filed on Dec. 9, 2002.

(51) Int. Cl.
*B65B 1/04* (2006.01)

(52) U.S. Cl. ............... 141/349; 141/348; 141/291; 141/294

(58) Field of Classification Search ........ 141/291–294, 141/319, 346–352; 137/614, 614.01, 614.02, 137/614.03, 614.06, 801; 222/571
See application file for complete search history.

(56) References Cited

U.S. PATENT DOCUMENTS

| | | | | |
|---|---|---|---|---|
| 5,056,570 A | * | 10/1991 | Harris et al. | ............ 141/59 |
| 5,813,432 A | * | 9/1998 | Elsdon et al. | ............ 137/413 |
| 6,619,341 B1 | * | 9/2003 | Cushing | ............ 141/198 |

* cited by examiner

*Primary Examiner*—Timothy L. Maust
(74) *Attorney, Agent, or Firm*—Kajane McManus

(57) ABSTRACT

The valved container assembly comprises a container having a combined inlet/outlet incorporating an inlet valve, an outlet tube positionable over the inlet, the outlet tube incorporating an inline flow control valve and an end valve which stops flow through the tube when flow into a receptacle for fluid from the container reaches a height below overflow, the assembly allowing no vapor escape during filling or emptying of the container.

9 Claims, 3 Drawing Sheets

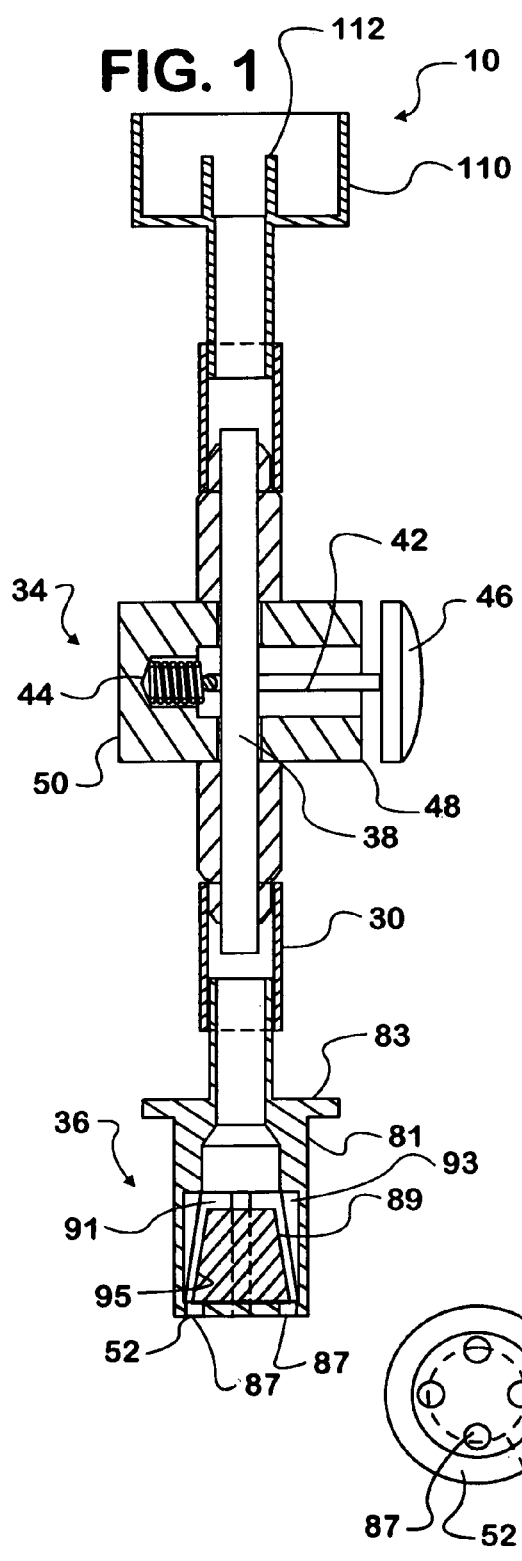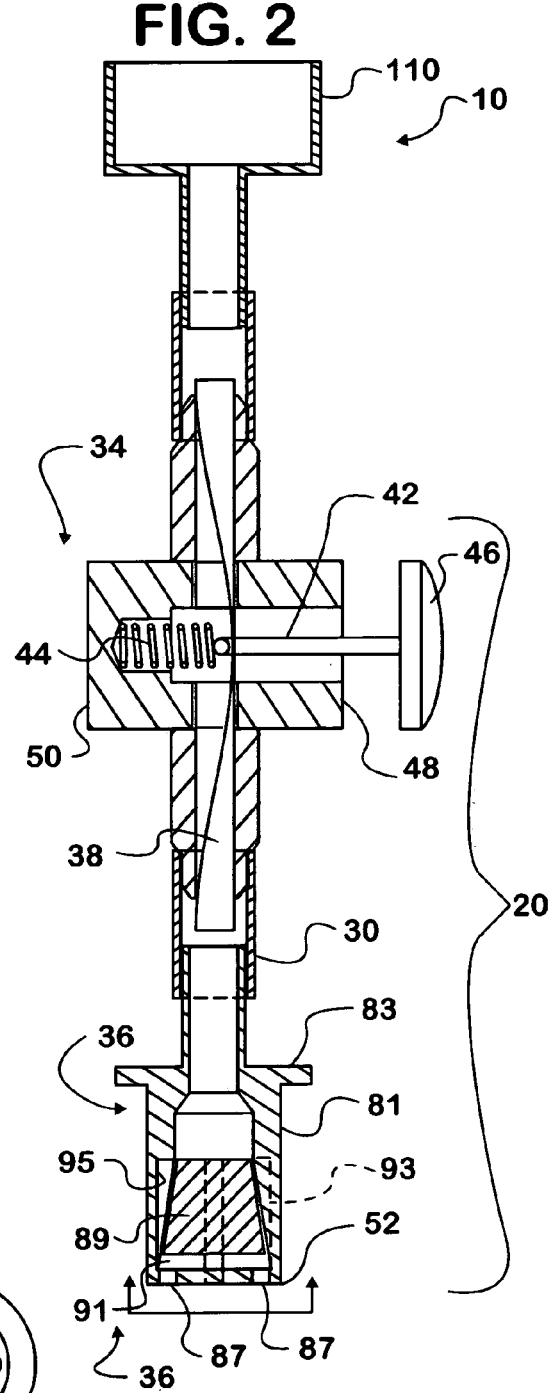

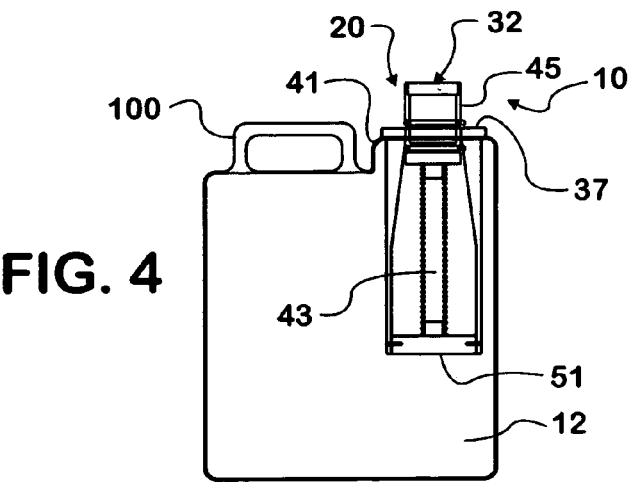
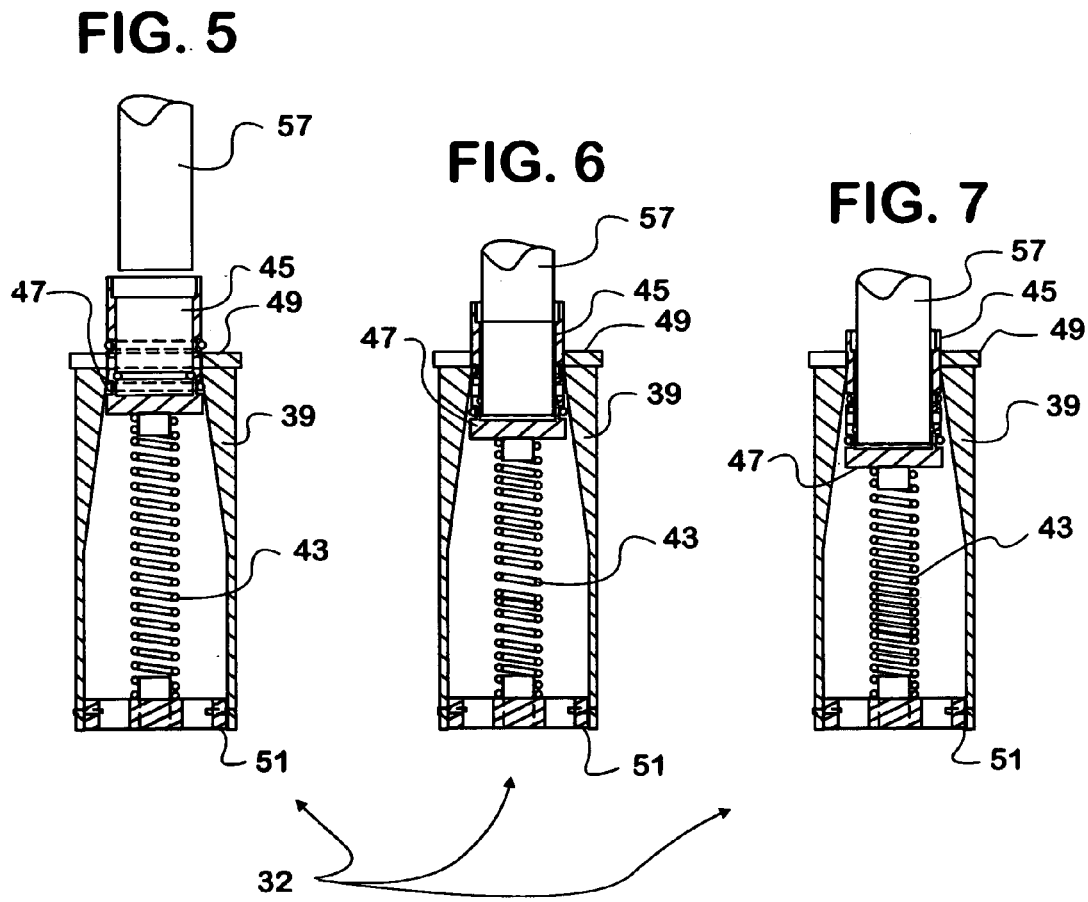

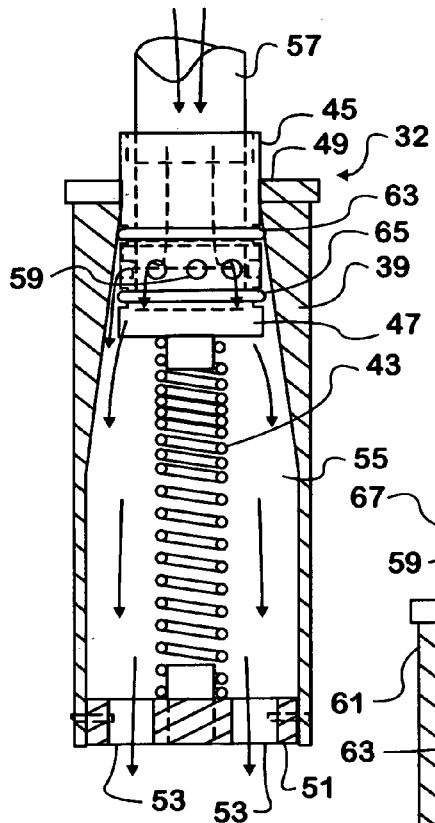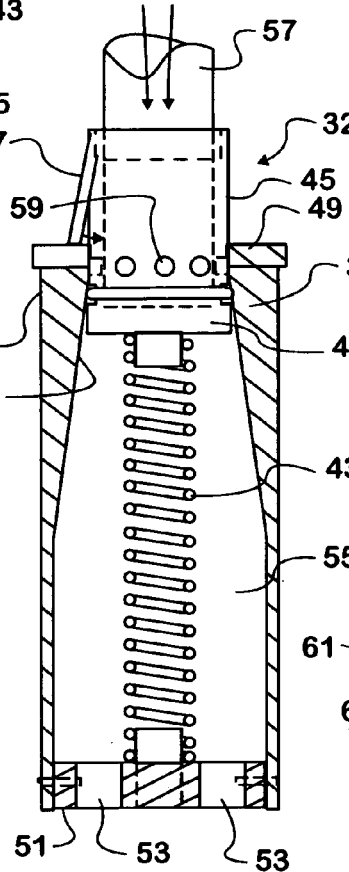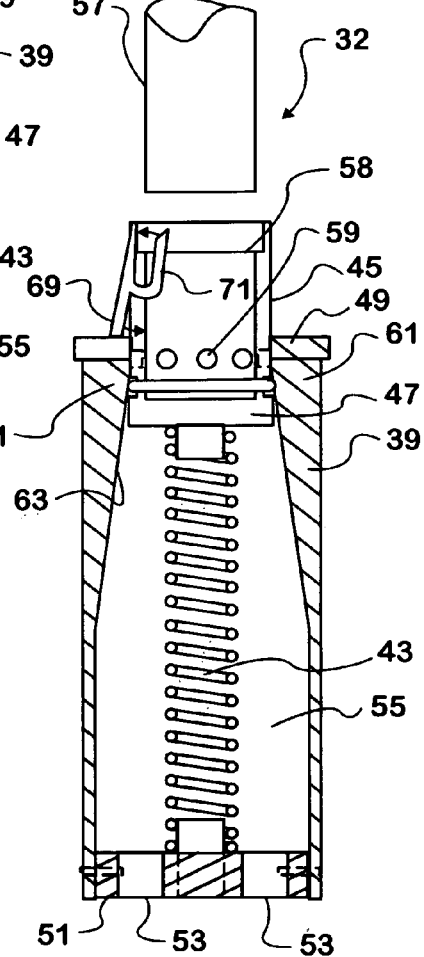

EASY USE VALVED FLUID CONTAINER ASSEMBLY AND VALVE SYSTEM FOR SAME

CROSS REFERENCE TO RELATED APPLICATIONS

This application is a continuation in part of U.S. patent application Ser. No. 10/313,224, filed Dec. 9, 2002, of the same title, currently pending, the teachings of which are incorporated herein.

BACKGROUND OF THE INVENTION

1. Field of the Invention

The present invention relates to a valved fluid container assembly including a container, such as, for example, a gas can, which is easy to use compared to those presently available and includes a valve system for greater accuracy in filling a device with fluid from the container, and for controlling flow of fluid from the container, without allowing vapor to escape therefrom.

2. Prior Art

Heretofore, various liquid containers have been proposed. Also valved liquid containers have been proposed.

There are certain requirements, for example, in the State of California under their Clear Air Act, that no venting of vapor to the ambient environment take place. The assembly of the present invention accommodates this requirement as no known prior art devices.

Further, no prior art devices have provided the ease of use and valving system which is described in greater detail hereinbelow.

SUMMARY OF THE INVENTION

According to the invention there is provided a valved container assembly comprising a fluid container, the container incorporating an inlet/outlet, the inlet/outlet incorporating at least an outlet tube engageable thereto, the outlet tube incorporating an inline valve for controlling flow of fluid through the tube, and the outlet tube further incorporating an end valve which acts to stop flow of fluid through the outlet tube before fluid exiting the outlet tube can cause an overflow from an item into which fluid from the container is flowing.

Further, according to the invention there is provided an inline valve for use in controlling flow through a flow line, the valve comprising a proximal end and a distal end mechanically engaged within and to the flow line, the valve incorporating a compressible tube therein and a stopper engaged about the compressible tube and being spring biased to maintain the tube in a compressed state so no flow can pass therethrough until force is applied onto the stop member against action of the biasing spring to allow decompression of the compressed tube for flow to pass therepast.

Still further, according to the invention there is also provided an end valve for use in a flow line to keep fluid passing through the flow line from overflowing an item into which fluid is being delivered by the flow line, the end valve having a proximal end and distal end and including a valve element therein, the valve element being configured to allow fluid flow therearound; a valve seat defining an entry into an outflow channel which allows fluid to flow out of the distal end of the tube when the inline valve is opened; a movable float engaged slidably within the valve seat and acting to close the valve via elevation of the float due to fluid contact therewith; the valve elements being housed within a housing having ports therein through which fluid can pass out into a container and in to cause elevation of the float.

Still further according to the invention there is provided an inlet valve in the inlet/outlet of the container for assuring no vapor leakage while the container is being filled.

Still further according to the invention there is provided a cap for engaging the assembly to either an inlet/outlet which does or does not an inlet valve therein.

BRIEF DESCRIPTION OF THE DRAWINGS

FIG. 1 is a cross sectional side view of a first embodiment of the valved container assembly.

FIG. 2 is a cross sectional side view of a second embodiment of the valved container assembly.

FIG. 3 is an end view of an outlet valve of the assembly of FIGS. 1 and 2.

FIG. 4 is a cross sectional view through a gas can incorporating a fill valve of the assembly.

FIG. 5 is a cross sectional view of the valve of FIG. 4 showing same prior to engagement of a gas nozzle.

FIG. 6 shows the nozzle seated within the valve.

FIG. 7 show the nozzle having opened the valve.

FIG. 8 is an enlarged more detailed cross sectional view through the valve of FIGS. 5–7.

FIG. 9 shows the valve of FIG. 8 to incorporate a first embodiment of a thumb latch.

FIG. 10 show the valve of FIG. 8 to incorporate a second embodiment of a thumb latch.

DESCRIPTION OF THE PREFERRED EMBODIMENTS

Referring now the drawings in greater detail, there is illustrated therein the easy use fluid container assembly with valving system for same, made in accordance with the teachings of the present invention and generally identified by the reference numeral 10.

As shown, the assembly 10 includes a container 12 which is designed to receive, hold, and ultimately dispense fluid therefrom. In the illustrative embodiment presented, the container 12 is shown to comprise a gas can 12, though this should not be construed as limiting.

Fluid containers 12, such as gas cans 12, are known to be of significant weight when filled, particularly when they are of large capacity, such as gas cans 12 used for filling boat motors (not shown). Such significant weight is, at best, unmanageable when emptying a conventional can provided with a typical top mount nozzle supplied with such can, especially when a woman attempts to lift such can and tilt same simultaneously for emptying thereof.

It is well known that due to the structure of such conventional cans, spillage of fluid, such as gasoline, is often unavoidable, although extremely undesirable.

It is also undesirable to allow gas fumes to vent from the can.

The assembly 10 of the present invention overcomes these undesirable features.

Flow from the container 12 must be controllable. Such is accomplished in the present embodiment by a valve system 20 incorporated onto the can 12, the illustrated valve system 20 incorporating three valves 32, 34 and 36. A first of the valves 32 will be referred to as a fill valve 32, a second of the valves 34, will be referred to as an inline valve 34 while the third of the valves 36 will be referred to as the end valve 36.

Beginning with the fill valve 32 which is seated within the combined inlet/outlet 37 of the container 12, it will be seen to comprise a housing 39 which engages within a neck 41 of the container 12, the neck 41 defining the inlet/outlet 37.

Within the housing 39 is a spring 43 which biases a valve element 45 in the form of a cylinder 45 having a closed bottom end 47 to a normally closed position, engaged against an upper end 49 of the housing 39. A bottom end 51 of the housing 39 has ports 53 therein through which liquid can flow in either direction, as necessary.

A cavity 55 within the housing 39 is rather conical in shape and the hollow cylindrical valve element 45 has a diameter which allows a fuel nozzle 57 to seat snugly therewithin, against an inner shoulder 58 thereof, the fuel nozzle 57 being the actuating mechanism for opening the valve element 45 for filling of the container 12.

The valve element 45 has a radial array of side ports 59 which abut against an upper area 61 of the inner wall 63 of the cavity 55 when in the closed position best shown in FIGS. 5, 9 and 10.

As the nozzle 57 is inserted into the hollow valve element 45 apply force against the biasing spring 42 and moving the valve element down into the cavity 55, the side ports 59 are now free to allow passage of fluid therethrough into the wider lower area of the cavity 55, with the fluid in turn flowing down through the cavity 55 and out the bottom ports 53 into the container 12. Once the container 12 is filled, the nozzle 57 is removed and the spring 43 returns the valve element 45 to the normally closed position.

To assure sealing against spillage, two seals 63 and 65 are provided around the periphery of the valve element 45, one above and one below the array of side ports 59.

If desired, to further assure maintenance of the valve element 45 in the closed position, lock latches, similar to 67 and 69, may also be incorporated. Lock latch 67 is a simple thumb latch 67 while lock latch 69 is actuated by insertion of nozzle 57 into the valve element 45 and against inner shoulder 58 thereof. Nozzle 57 pulls a finger 71 of the latch 69 inwardly upon insertion, bringing latch 69 therewith.

The inline valve 34 will be seen to incorporate a flexible fluid passageway or tube 38 therethrough which is in line with a lumen 40 of the tubing 30. Extending transversely to and passing diametrically about the tube 38 is a stopper 42 which is biased by a spring 44 to a normally closed position as shown in FIG. 2, to keep fluid from passing therethrough by pinching the tube 38 closed.

The stopper 42 includes a knob 46 at an end 48 opposite the spring biased end 50 which is manually manipulated and held downwardly to force the stopper 42 against action of the biasing spring 44 when it is desired to deliver fluid from the container 12.

It will be understood that when the stopper 42 is in the depressed position, as best shown in FIG. 1, the tube 38 of the valve 34 flexes open and fluid is allowed pass therethrough to the end valve 36. Upon release of the knob 46, the valve 34 closes.

Turning now to the end valve 36 of the assembly 10, it will first be understood that in use, a free distal or depending end 52 of the valve 36 is placed downwardly into an item to be filled from the container 12.

The end valve 36 comprises a housing 81 a first end 83 of which engages tubing 30 leading thereto from the inline valve 34.

The free end 52 has ports 87 therein through which fluid passes into an item being filled (not shown) from the container 12.

Within the housing 81 is a somewhat conical float 89 seated within a conical valve seat 91 which has a larger diameter than that of the float 69 at the free end 52 of the housing 81. Thus, when the inline valve 34 is opened, the float 69 is pushed toward the free end 52 and liquid from the container 12 can pass therearound, and out the ports 87.

It will be understood that, with the free end 52 of the valve 36 being downwardly disposed in the item being filled, should fluid in the item rise to a level to enter the valve 36 via end ports 87, the float 89 will be moved upwardly, stopping fluid flow into the item.

Thus, by motion of the float 89, which is moved by the rising level of fluid in the item being filled from the container 12, overflow of fluid from the item being filled, is avoided.

To maintain the float 89 centered within the seat 91, a plurality of ribs 93 are provided within a channel 95 of the valve seat 91 to maintain the float 89 centered therewithin.

Turning back to the container 12, in the preferred embodiment, a carrying handle 100 is provided on a top surface 102 thereof.

A threaded rotatable cap 110 is also provided for engagement over the inlet/outlet 37.

The embodiment shown in FIG. 2 is provided for use with a container 12 having no inlet valve 32 therein, merely being threaded onto the typical opening in the container 12.

The embodiment of the cap 110 shown in FIG. 1 is proposed for use with a container 12 having an inlet valve 32 therein, and incorporates a circular shoulder 112 therein which coacts with the inner shoulder 58 of cylinder 45, pushing cylinder or valve element 45 downwardly so that outflow from the container 12 can take place through the side ports 59.

As described above, the assembly 10 provides a number of advantages, some of which have been described above and others of which are inherent in the invention. Also, modifications to the structures disclosed herein may be proposed without departing from the teachings herein. Accordingly, the scope of the invention is only to be limited as necessitated by the accompanying claims.

What is claimed is:

1. A valved container assembly comprising a fluid container, the container incorporating a combined inlet/outlet, an inlet valve and an outlet tube, the outlet tube incorporating a cap which engages over the combined inlet/outlet, an inline valve for controlling flow of fluid through the tube, an end valve which acts to stop flow of fluid through the outlet tube before fluid exiting the outlet tube can cause an overflow from an item into which fluid from the container is flowing, the inline valve being a normally closed valve including a compressible tube therein which is pinched closed by a spring biased stopper.

2. The assembly of claim 1 wherein the normally closed valve includes a depressible knob which depresses the stopper and opens flow through the valve.

3. The assembly of claim 2 wherein the stopper is returned to its normally closed position by a biasing spring when depression of the knob ceases.

4. The assembly of claim 1 wherein the end valve is an overflow control valve.

5. The assembly of claim 4 wherein the valve seat defines an entry into an outflow channel defined by a channel defining wall which in turn has a float seated therewithin which is movable along a length thereof.

6. The assembly of claim 5 wherein the float of the assembly rises as fluid enters through fluid ports in a housing thereof.

7. The assembly of claim 1 incorporating an inlet valve comprising a compressible inlet cylinder which is normally closed and a cap on the tube seats over same.

8. The assembly of claim 7 wherein the cylinder is compressible by a gas nozzle.

9. The assembly of claim 8 wherein the cylinder is compressible by a shoulder in the cap.

* * * * *